(12) United States Patent
Zhou et al.

(10) Patent No.: US 11,602,729 B2
(45) Date of Patent: Mar. 14, 2023

(54) MAGNETIC POLYMER ADSORPTION MATERIAL, PREPARATION METHOD THEREFOR AND APPLICATION THEREOF

(71) Applicants: NANJING UNIVERSITY, Nanjing (CN); JIANGSU GUOCHUANG ENVIRO-PROTECTION TECHNOLOGY CO., LTD, Nanjing (CN)

(72) Inventors: Qing Zhou, Nanjing (CN); Zhijian Yao, Nanjing (CN); Aimin Li, Nanjing (CN); Wei Jiao, Nanjing (CN); Chendong Shuang, Nanjing (CN); Qimeng Li, Nanjing (CN); Jie Sun, Nanjing (CN)

(73) Assignees: NANJING UNIVERSITY, Nanjing (CN); Jiangsu Guochuang Enviro-Protection Technology Co., Ltd, Nanjing (CN)

( * ) Notice: Subject to any disclaimer, the term of this patent is extended or adjusted under 35 U.S.C. 154(b) by 272 days.

(21) Appl. No.: 16/954,210

(22) PCT Filed: Jan. 11, 2018

(86) PCT No.: PCT/CN2018/072220
§ 371 (c)(1),
(2) Date: Jun. 16, 2020

(87) PCT Pub. No.: WO2019/119568
PCT Pub. Date: Jun. 27, 2019

(65) Prior Publication Data
US 2020/0316562 A1 Oct. 8, 2020

(30) Foreign Application Priority Data
Dec. 18, 2017 (CN) .......................... 201711364158.7

(51) Int. Cl.
*B01J 20/26* (2006.01)
*B01J 20/22* (2006.01)
(Continued)

(52) U.S. Cl.
CPC ............. *B01J 20/261* (2013.01); *B01J 20/06* (2013.01); *B01J 20/22* (2013.01);
(Continued)

(58) Field of Classification Search
None
See application file for complete search history.

(56) References Cited

U.S. PATENT DOCUMENTS

2002/0064502 A1* 5/2002 Gries ................. A61K 49/0002
424/9.322
2007/0249747 A1* 10/2007 Tsuji ........................ C08J 5/005
522/3
(Continued)

FOREIGN PATENT DOCUMENTS

CN 2006088131 A 4/2006
CN 20200500161.9 * 1/2011
(Continued)

*Primary Examiner* — Joseph D Anthony
(74) *Attorney, Agent, or Firm* — Shen Huang

(57) ABSTRACT

A magnetic polymer adsorption material, preparation method and use thereof, which relate to the field of magnetic polymer materials. The preparation method comprises: (1) preparing magnetic nanoparticles; (2) dissolving the magnetic nanoparticles in a pore-forming agent, adding N-vinylpyrrolidone, divinylbenzene and an initiator respectively, and mixing uniformly; (3) adding an emulsifier and a dispersant into an aqueous solution; adding a part of the oil phase solution prepared in step (2) at the temperature below 60° C., and adding the rest of the oil phase solution when the temperature rises to 60° C. or above, reacting with stirring, precipitating and filtering the reacted solution, washing and drying the precipitate, and finally obtaining the magnetic (Continued)

polymer adsorption material. The material has the particle size of 2-100 μm, the magnetization of 5-19.5 emu/g and the specific surface area of 210-950 m²/g, and can be applied to the adsorption of inorganic and organic matters in solutions, the controlled release of inorganic and organic matters, and the separation of different substances.

6 Claims, 2 Drawing Sheets

(51) Int. Cl.
    *B01J 20/06*     (2006.01)
    *C02F 1/28*     (2023.01)
    *C02F 1/48*     (2023.01)
    *B01J 20/28*     (2006.01)
    *B01J 20/30*     (2006.01)
    *C02F 101/10*     (2006.01)
    *C02F 101/30*     (2006.01)

(52) U.S. Cl.
    CPC ... *B01J 20/28004* (2013.01); *B01J 20/28009* (2013.01); *B01J 20/28021* (2013.01); *B01J 20/28061* (2013.01); *B01J 20/28064* (2013.01); *B01J 20/3064* (2013.01); *B01J 20/3071* (2013.01); *B01J 20/3085* (2013.01); *C02F 1/288* (2013.01); *C02F 1/48* (2013.01); *C02F 1/281* (2013.01); *C02F 1/285* (2013.01); *C02F 2101/10* (2013.01); *C02F 2101/30* (2013.01)

(56) References Cited

U.S. PATENT DOCUMENTS

| | | | | |
|---|---|---|---|---|
| 2011/0076767 | A1* | 3/2011 | Chrony | A61K 47/59 435/375 |
| 2012/0111499 | A1* | 5/2012 | Roos | C08K 9/08 156/330 |
| 2013/0156792 | A9* | 6/2013 | Levy | A61K 47/42 424/94.4 |
| 2013/0345412 | A1* | 12/2013 | Garrell | C07F 19/00 556/418 |
| 2019/0247522 | A1* | 8/2019 | Hsieh | A61K 49/1839 |
| 2019/0259517 | A1* | 8/2019 | Vaseem | C01G 49/08 |

FOREIGN PATENT DOCUMENTS

| | | | | |
|---|---|---|---|---|
| CN | 201110426866.5 | * | 6/2012 | |
| CN | 201010017687.1 | * | 7/2012 | |
| CN | 201310106265.5 | * | 6/2013 | |
| CN | 103497281 A | | 1/2014 | |
| CN | 201310330339.3 | * | 1/2014 | |
| CN | 103739764 A | | 4/2014 | |
| CN | 104211851 A | | 12/2014 | |
| CN | 201510603600.1 | * | 11/2015 | |
| CN | WO2017098314 A4 | | 9/2017 | |
| CN | 107376870 | * | 11/2017 | C02F 1/285 |

* cited by examiner

MAGNETIC POLYMER ADSORPTION MATERIAL, PREPARATION METHOD THEREFOR AND APPLICATION THEREOF

CROSS REFERENCE TO RELATED APPLICATION

This application is a national stage application of International application number PCT/CN2018/072220, filed Jan. 11, 2019, titled "MAGNETIC POLYMER ADSORPTION MATERIAL, PREPARATION METHOD THEREFOR AND APPLICATION THEREOF", which claims the priority benefit of Chinese Patent Application No. 1711364158.7, filed on Dec. 18, 2017, which is hereby incorporated by reference in its entirety.

TECHNICAL FIELD

The present invention belongs to the field of polymer material preparation methods and application thereof, and particularly relates to a magnetic polymer adsorption material, a preparation method therefor and application thereof.

BACKGROUND

In recent years, magnetic polymer materials have shown great application potential in the pretreatment and adsorption removal of environmental pollutants, due to their high adsorption capacity and good separation performance. At present, magnetic polymer adsorption materials used in the environmental field are mainly divided into two categories, one is ion exchange materials, and the other is hyper-cross-linked materials with high specific surface area.

Through retrieval, we found that relevant applications have been disclosed in the prior art. For example, Chinese patent No. CN201010017687.1, published on Jul. 4, 2012, discloses a method for preparing a magnetic acrylic acid-based strongly basic anion exchange resin. The magnetic resin in the application has a better removal effect on anions in water, such as dissolved organic matters, nitrates and phosphates. And Chinese patent No. CN201010500161.9, published on Jan. 19, 2011, discloses a method for synthesizing a magnetic weak acid cation exchange resin. The magnetic resin in the application is mainly used for removal of cationic substances such as ammonium and metal ions, and the application scope thereof is limited.

Furthermore, Chinese patent No. CN201110426866.5, published on Jun. 27, 2012, discloses a magnetic microsphere resin with high specific surface area and a preparation method and use thereof. The material in the application has very excellent efficiency of removing nonpolar and electrically neutral substances in water, but the removal effect on strongly polar or charged substances is not ideal.

In view of the shortcomings of the prior art, Chinese patent No. CN 201310106265.5, published on Jun. 19, 2013, discloses a magnetic amino-modified hyper-cross-linked resin and a preparation method thereof. Chinese patent No. CN 201310330339.3, published on Jan. 8, 2014, discloses a weak acid modified magnetic resin with high specific surface area, a preparation method thereof and a method for efficiently purifying slightly-polluted water. The magnetic materials in the above two applications are hyper-cross-linked materials modified by groups. These materials have rich pores and high ion exchange capacity, which effectively expands the application range of magnetic polymer materials. However, such materials also have inevitable shortcomings: 1) it is difficult to achieve both high specific surface area and ion exchange capacity; and 2) it is difficult to adapt to the wide adsorption of organics in water, which needs to modify the specific groups for target substances.

Also, we found that Chinese patent No. CN201510603600.1, published on Nov. 11, 2015, discloses a hydrophilic polymer microsphere and a preparation method thereof. The material prepared by the method has good adsorption effects on hydrophilic and hydrophobic pollutants. The method of the application comprises taking N-vinylpyrrolidone and lipophilic divinylbenzene as monomers, and mixing the N-vinylpyrrolidone, the divinylbenzene, an initiator and a pore-forming agent in proportion, stirring, and reacting with heating; after the reaction, performing precipitation, filtration, washing, re-filtration and drying to obtain a hydrophilic polymer microsphere. The N-vinylpyrrolidone is a polymer which can be completely miscible with water, while the divinylbenzene is strongly hydrophobic, so it is difficult for the two compounds to fully react in the polymerization process. The overall yield of hydrophilic polymer microspheres synthesized by the above preparation method is unstable, so that the hydrophilicity and specific surface area of the hydrophilic polymer microspheres need to be improved by increasing the amount of the N-vinylpyrrolidone, which is not suitable for large-scale popularization. In addition, the prepared materials are not magnetic, and cannot adapt to wide adsorption of organics in water. Therefore, the application range is limited.

Accordingly, in the preparation process of magnetic polymer materials, how to prepare a magnetic polymer adsorption material with high specific surface area useful for the wide adsorption of organics in water is a problem that needs to be solved.

SUMMARY

1. Problems to be Solved

In view of the shortcomings that the magnetic materials prepared in the prior art have limitations on adsorption and cannot adapt to the wide adsorption of organics in water, the present invention provides a magnetic polymer adsorption material with good particle size uniformity, strong magnetism and strong adsorption.

2. Technical Solution

In order to solve the foregoing problems, the technical solutions adopted by the present invention are as follows:

The present invention provides a method for preparing a magnetic polymer adsorption material, comprising the following steps:

(1) preparing magnetic nanoparticles;

(2) formulating the oil phase solution: dissolving the magnetic nanoparticles prepared in step (1) in a pore-forming agent, adding N-vinylpyrrolidone, divinylbenzene and an initiator respectively, and mixing the above materials uniformly under the condition of ice bath; and (3) synthesizing the magnetic polymer adsorption material: adding an emulsifier and a dispersant into an aqueous solution; adding a part of the oil phase solution prepared in step (2) at the temperature below 60° C., and adding the rest of the oil phase solution when the temperature rises to 60° C. or above, wherein the volume of the oil phase solution added each time accounts for 10-90% of the total volume of the oil phase solution, reacting with stirring, then precipitating and filtering the reacted solution, washing and drying the precipitate, and finally obtaining the magnetic polymer adsorption material.

As a further improvement of the present invention, the magnetic nanoparticles are $Fe_3O_4@$ organic acid nanoparticles, and the preparation process comprises: formulating soluble salts of $Fe^{2+}$ and $Fe^{3+}$ into a solution, mixing, introducing nitrogen for protection, adding a precipitating agent and an organic acid at 60-100° C., reacting for 0.5-12 h, adjusting the pH of the solution to be acidic, and washing and drying the product to obtain the magnetic $Fe_3O_4@$ organic acid nanoparticles.

As a further improvement of the present invention, in step (3), the stirring is performed at 100-1500 rpm for 12-80 h, and the reaction with stirring is performed at 60-95° C.

As a further improvement of the present invention, the mass of the N-vinylpyrrolidone accounts for 10-90% of the total mass of the N-vinylpyrrolidone and the divinylbenzene.

As a further improvement of the present invention, the volume of the pore-forming agent is 0.05-2 times that of the aqueous solution; the mass of the emulsifier accounts for 0.1-20% of the total mass of the N-vinylpyrrolidone and the divinylbenzene; the mass of the dispersant accounts for 0-10% of the total mass of the N-vinylpyrrolidone and the divinylbenzene; and the mass of the initiator accounts for 0.1-5% of the total mass of the N-vinylpyrrolidone and the divinylbenzene.

As a further improvement of the present invention, the initiator is an azo or benzoyl compound; the pore-forming agent is one or more of methanol, toluene, cyclohexanol, DMF and DMSO; the emulsifier is an anionic surfactant; the dispersant is one or more of PVP, HEC and PEG; the molar ratio of the soluble salt of $Fe^{2+}$ to the soluble salt of $Fe^{2+}$ is 1:(0.23-5.5); the mass of the organic acid is 0.5-5 times that of the magnetic $Fe_3O_4$ nanoparticles; and the precipitating agent is an alkaline solution.

As a further improvement of the present invention, the magnetic polymer adsorption material synthesized by the above method has the average particle size of 2-100 μm, the magnetization of 5-19.5 emu/g and the specific surface area of 210-950 m$^2$/g.

As a further improvement of the present invention, the material is useful for the adsorption of inorganic and organic matters in solutions.

As a further improvement of the present invention, the material is useful for the controlled release of inorganic and organic matters.

As a further improvement of the present invention, the material is useful for the separation of different substances.

3. Beneficial Effects

Compared with the prior art, the present invention has the following beneficial effects:

(1) Using the method for preparing the magnetic polymer adsorption material according to the present invention, a broad-spectrum adsorption material suitable for organic matters in water could be obtained. The method comprises first formulating the oil phase solution: dissolving the prepared magnetic nanoparticles in a pore-forming agent, adding N-vinylpyrrolidone, divinylbenzene and an initiator respectively, and mixing the above materials uniformly at low temperature; then adding an emulsifier and a dispersant into an aqueous solution; adding a part of the oil phase solution at the temperature below 60° C., adding the rest of the oil phase solution when the temperature rises to 60° C. or above, reacting with stirring, then precipitating and filtering the reacted solution, washing and drying the precipitate, and finally obtaining the magnetic polymer adsorption material. The method of the present invention overcomes the shortcomings that: in the process of preparing an adsorption material by using N-vinylpyrrolidone and divinylbenzene as monomers, the strong hydrophilicity of the N-vinylpyrrolidone and the strong hydrophobicity of the divinylbenzene lead to poor reaction and unstable yield, when the N-vinylpyrrolidone, the divinylbenzene, an initiator and a pore-forming agent are uniformly mixed and stirring and reaction with heating are performed.

(2) The method for preparing the magnetic polymer adsorption material according to the present invention overcomes the shortcomings that: in the process of preparing an adsorption material by using N-vinylpyrrolidone and divinylbenzene as monomers, it is difficult to introduce magnetic nanoparticles. And the prepared material has some adsorption performance, but it is not magnetic. Using the N-vinylpyrrolidone, the divinylbenzene and the magnetic nanoparticles that have different properties, and introducing the magnetic nanoparticles in the simple preparation step, the materials having strong magnetism and larger specific surface area are prepared, and the adsorption performance and application range of the materials are greatly improved.

(3) According to the method for preparing the magnetic polymer adsorption material of the present invention, the raw materials have low costs, and the preparation method is simple and favorable for popularization.

(4) The magnetic polymer adsorption material according to the present invention has the average particle size of 2-100 μm with good uniformity; and the material has the magnetization of 5-19.5 emu/g and the specific surface area of 210-950 m$^2$/g, thereby not only having larger specific surface area, but also having stronger magnetism and good adsorption effects on hydrophilic and hydrophobic substances, metal ions, etc. Compared with Oasis HLB material and XAD-4 resin material with the same specific surface area, the material of the present invention remarkably improves the pollutant adsorption capacity.

(5) The magnetic polymer adsorption material according to the present invention can be rapidly separated from the solution under the action of an external magnetic field, which is simple to operate and effectively reduces the analysis time.

(6) The magnetic polymer adsorption material according to the present invention is environmental friendly, it enables mass production and repeated use. Therefore, it has the wide application prospect in the fields of environmental treatment, detection, drug separation, etc.

DETAILED DESCRIPTION

The present invention is further described below with reference to specific examples. The following examples are merely used to explain the technical solutions and cannot be used to limit the protection scope of the present invention.

Example 1

In this example, the preparation of the magnetic polymer adsorption material comprises the following steps:

(1) Preparation of the magnetic $Fe_3O_4@$ oleic acid nanoparticles: 1 g of ferrous chloride, 2 g of ferric chloride and 100 mL water were added into a 250 mL flask, electrically stirring and mixing, and nitrogen was introduced for protection, and then 20 mL of 4 mol/L sodium hydroxide solution and 0.75 g of oleic acid were added at 60° C., at this point, the mass of the oleic acid was 0.5 time that of the magnetic $Fe_3O_4$ nanoparticles; after reaction for 10 h, the pH of the solution was adjusted to 3; the product was washed with water and ethanol for 5 times, and the magnetic $Fe_3O_4@$ oleic acid nanoparticles were obtained after drying.

(2) Formulation of the oil phase solution: 2 g of the magnetic $Fe_3O_4@$ oleic acid nanoparticles were dissolved in 30 mL of toluene solution, and 3 g of N-vinylpyrrolidone, 3 g of divinylbenzene and 0.05 g of AIBN were added respectively, and mixed uniformly under the ice bath to obtain the oil phase solution, wherein the mass of the N-vinylpyrrolidone accounted for 50% of the total mass of the N-vinylpyrrolidone and the divinylbenzene, and the mass of the initiator AIBN accounted for 0.8% of the total mass of the N-vinylpyrrolidone and the divinylbenzene.

(3) Synthesis of the magnetic polymer adsorption material: 0.5 g of emulsifier SDS and 0.25 g of dispersant HEC were added into 50 mL of aqueous solution; half of the oil phase solution was added at 45° C. and the other half of the oil phase solution at 65° C., wherein the mass of the emulsifier accounted for 8.3% of the total mass of the N-vinylpyrrolidone and the divinylbenzene, and the mass of the dispersant accounted for 4.2% of the total mass of the N-vinylpyrrolidone and the divinylbenzene; after stirring for 24 h at 300 rpm, 65° C., the reacted solution was precipitated and filtered, the precipitate was washed with methanol for 5 times, and dried at 65° C. for 12 h to finally obtain the magnetic polymer adsorption material.

Figure 1:
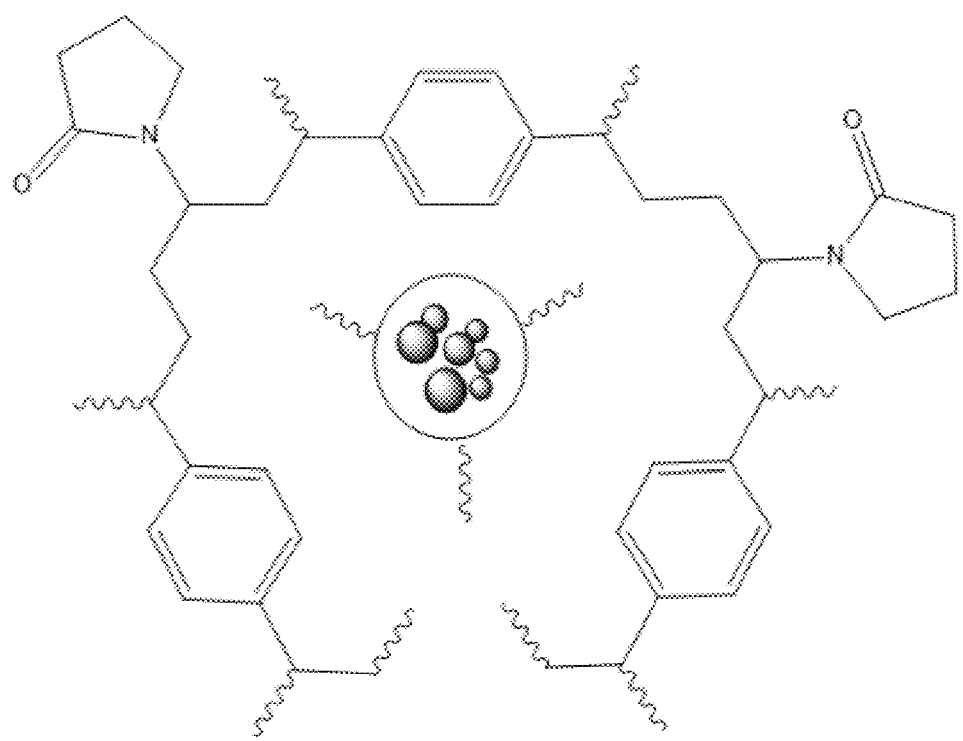
FIG. 1 is a schematic diagram of the basic structure of the magnetic polymer adsorption material according to the present invention.

The basic structure of the material is shown in FIG. 1. According to the reaction mechanism, the two double bonds of the monomer divinylbenzene added may be opened for chain propagation; and monomer radicals activated in the reaction can form new radicals with the N-vinylpyrrolidone, the divinylbenzene or the magnetic nanoparticles containing oleic acid to perform chain propagation until chain termination.

Figure 2:
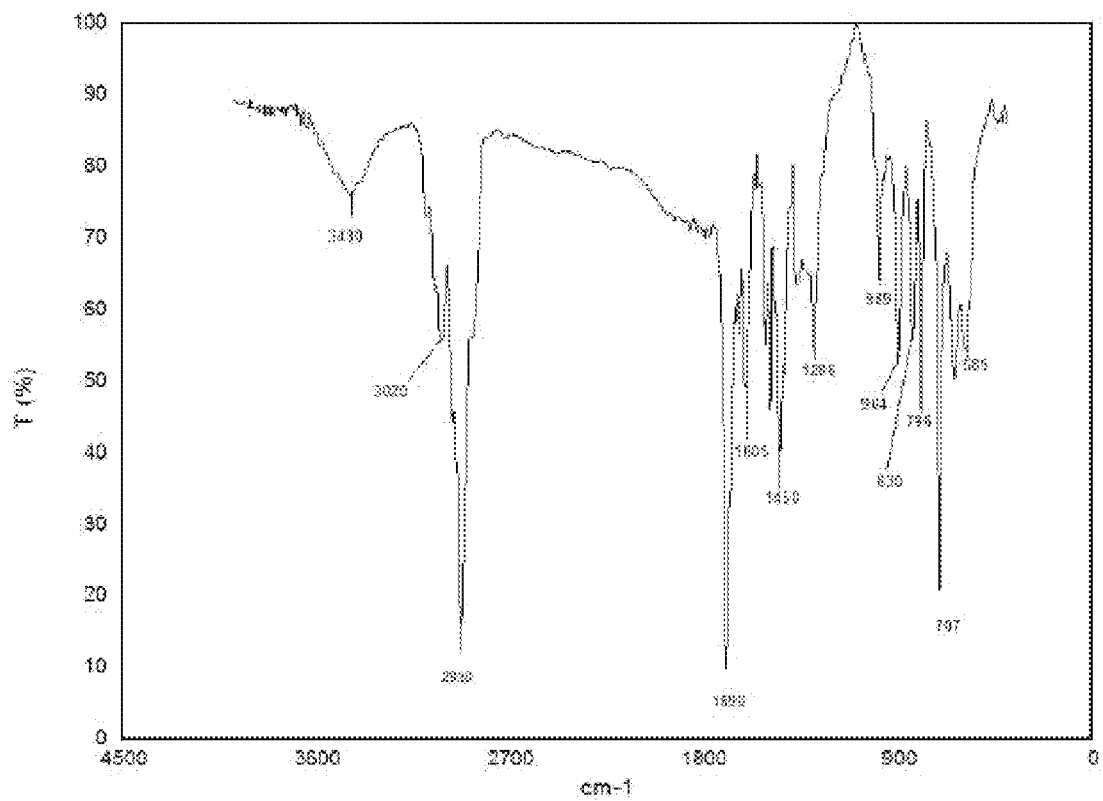
FIG. 2 is a Fourier transform infrared (FT-IR) spectrum of the magnetic polymer adsorption material according to the present invention.

The structural characterization diagram of FTIR of the material is shown in FIG. 2. The characteristic peak at 1690 $cm^{-1}$ is the C=O bond of the N-vinylpyrrolidone, 707 $cm^{-1}$ and 796 $cm^{-1}$ are the characteristic peaks of benzene ring, and 3430 $cm^{-1}$ and 585 $cm^{-1}$ are the characteristic peaks of $Fe_3O_4$ nanoparticles.

Figure 3:
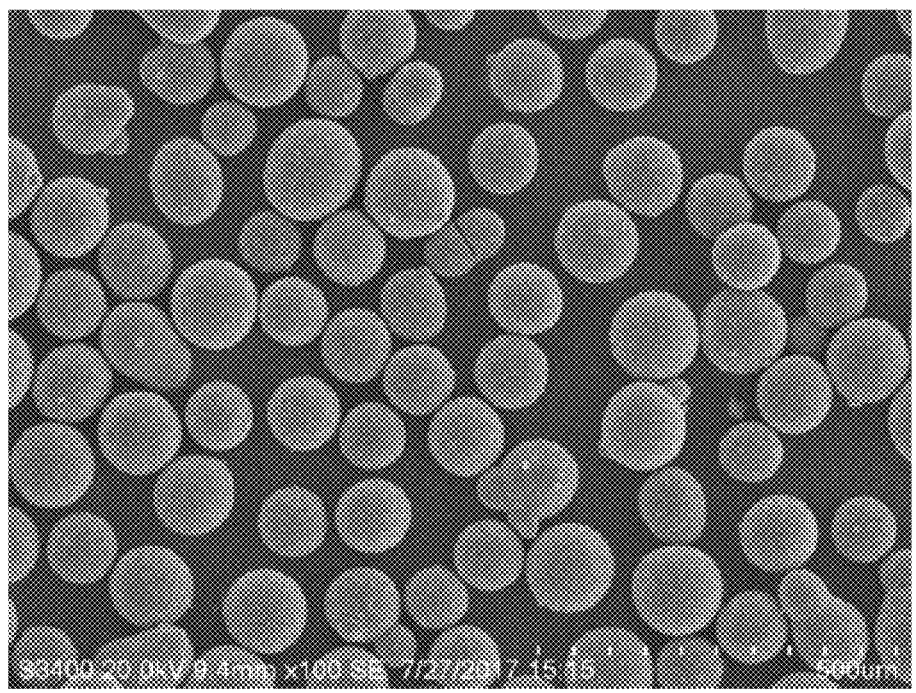
FIG. 3 is a scanning electron microscope (SEM) image of the magnetic polymer adsorption material according to the present invention.

The SEM image of the material is shown in FIG. 3. The particle size of the magnetic polymer adsorption material is concentrated at 100 μm. It can be seen from FIG. 1, the particle size distribution of the material is relatively uniform, and its specific surface area is 681.5 $m^2/g$ as measured by the automatic specific surface area and porosity analyzer, its magnetization is 15 emu/g as measured by the vibrating sample magnetometer. The experiments have shown that the adsorption capacity of the magnetic polymer adsorption material to the nitrobenzene compounds in water is 389 mg/g at 25° C.

The adsorption capacity of Oasis HLB material with the same specific surface area produced commercially by Waters Corporation is only 157 mg/g, and that of commercial XAD-4 resin is only 25.7 mg/g. The material prepared in this example has a significant increase in the adsorption of pollutants. After the adsorption experiment, only an external magnet is needed to separate the adsorption material from the solution; compared with the commercial Oasis HLB and XAD-4 resin, the post-treatment of the material prepared in this example is simple, feasible and convenient.

Comparative Example A (1) Preparation of the magnetic $Fe_3O_4@$ oleic acid nanoparticles: 1 g of ferrous chloride, 2 g of ferric chloride and 100 mL water were added into a 250 mL flask, electrically stirring and mixing, and nitrogen was introduced for protection, and then 20 mL of 4 mol/L sodium hydroxide solution and 4 g of oleic acid were added at 60° C., at this point, the mass of the oleic acid was 0.9 time that of the magnetic $Fe_3O_4$ nanoparticles; after reaction for 10 h, the pH of the solution was adjusted to 3, the product was washed with water and ethanol for 5 times, and the magnetic $Fe_3O_4@$ oleic acid nanoparticles were obtained after drying.

(2) N-vinylpyrrolidone, divinylbenzene, a pore-forming agent toluene and an initiator AIBN were mixed, and then the mixture was added into a three-necked flask containing anhydrous ethanol as organic phase, followed by the magnetic $Fe_3O_4@$ oleic acid nanoparticles in step (1); after reaction with heating for a certain time, the product was filtered, washed and dried.

After testing, the magnetization of the material prepared in the foregoing steps is very small (<0.1 emu/g), which cannot be magnetically separated in the solution. It is not possible to synthesize the magnetic polymer adsorption materials by changing the way of adding magnetic nanoparticles and the proportion of addition many times.

Comparative Example B (1) Preparation of the magnetic $Fe_3O_4@$ oleic acid nanoparticles: 1 g of ferrous chloride, 2 g of ferric chloride and 100 mL water were added into a 250 mL flask, electrically stirring and mixing, and nitrogen was introduced for protection, and then 20 mL of 4 mol/L sodium hydroxide solution and 4 g of oleic acid were added at 60° C., at this point, the mass of the oleic acid was 0.9 time that of the magnetic $Fe_3O_4$ nanoparticles; after reaction for 10 h, the pH of the solution was adjusted to 3, the product was washed with water and ethanol for 5 times, and the magnetic $Fe_3O_4@$ oleic acid nanoparticles were obtained after drying.

(2) N-vinylpyrrolidone, divinylbenzene, a pore-forming agent toluene and an initiator AIBN were mixed, and then the mixture was added into an aqueous solution containing one or more of sodium chloride, gelatin, polyvinyl alcohol and a surfactant, then the magnetic $Fe_3O_4@$ oleic acid nanoparticles in step (1); after reaction with heating for a certain time, the product was filtered, washed and dried.

After testing, the magnetization of the material prepared in the foregoing steps is very small (<0.3 emu/g), which cannot be magnetically separated in the solution. It is not possible to synthesize the magnetic polymer adsorption material by changing the way of adding magnetic nanoparticles for many times.

As seen from the Comparative Example A and Comparative Example B, according to the preparation method using N-vinylpyrrolidone and divinylbenzene as monomers in the prior art, it is difficult to introduce magnetic nanoparticles and prepare the magnetic polymer adsorption material.

Example 2

In this example, the preparation of the magnetic polymer adsorption material comprises the following steps:

(1) Preparation of the magnetic $Fe_3O_4@$ oleic acid nanoparticles: 2.6 g of ferrous chloride, 6.4 g of ferric chloride and 200 mL water were added into a 500 mL flask, electrically stirring and mixing, and nitrogen was introduced for protection, and then 40 mL of 2 mol/L potassium hydroxide solution and 4 g of oleic acid were added at 100° C., wherein the mass of the oleic acid was twice that of the magnetic $Fe_3O_4$ nanoparticles; after reaction for 6 h, the pH of the solution was adjusted to 3; the product was washed with water and methanol for 5 times, and the magnetic $Fe_3O_4@$ oleic acid nanoparticles were obtained after drying.

(2) Formulation of the oil phase solution: 1 g of the magnetic $Fe_3O_4@$ oleic acid nanoparticles were dissolved in 10 mL of cyclohexanol solution, and 2 g of N-vinylpyrrolidone, 1.5 g of divinylbenzene and 0.07 g of AIBN were added respectively, and mixed uniformly under the ice bath to obtain the oil phase solution, wherein the mass of the N-vinylpyrrolidone accounted for 57% of the total mass of the N-vinylpyrrolidone and the divinylbenzene, and the mass of the initiator AIBN accounted for 2% of the total mass of the N-vinylpyrrolidone and the divinylbenzene.

(3) Synthesis of the magnetic polymer adsorption material: 0.1 g of emulsifier SDS and 0.05 g of dispersant HEC were added into 200 mL of aqueous solution; 10% of the oil phase solution was added at 45° C. and the rest of the oil phase solution at 65° C., wherein the mass of the emulsifier accounted for 2.9% of the total mass of the N-vinylpyrrolidone and the divinylbenzene, and the mass of the dispersant accounted for 1.45% of the total mass of the N-vinylpyrrolidone and the divinylbenzene; after stirring for 48 h at 500 rpm, 65° C., the reacted solution was precipitated and filtered, the precipitate was washed with methanol for 5 times, and dried at 75° C. for 24 h to finally obtain the magnetic polymer adsorption material.

The magnetic polymer adsorption material obtained in this example had the particle size concentrated in 10 μm, the specific surface area of 714 $m^2/g$ and the magnetization of 12 emu/g. The adsorption capacity of the material to tetracycline in water was 275 mg/g at 25° C. The magnetic polymer material saturated by tetracycline adsorption was separated by an external magnetic field and then added into pure water for ultrasonic treatment, and the ultrasonic power and time could be adjusted to control the content of tetracycline released in the water. Therefore, the material can also be used for the controlled release of tetracycline.

Example 3

In this example, the preparation of the magnetic polymer adsorption material comprises the following steps:

(1) Preparation of the magnetic $Fe_3O_4@$ oleic acid nanoparticles: 1 g of ferrous chloride, 7 g of ferric chloride and 100 mL water were added into a 250 mL flask, electrically stirring and mixing, and nitrogen was introduced for protection, and then 20 mL of saturated ammonia solution and 3 g of oleic acid were added at 70° C., wherein the mass of the oleic acid was 1.7 times that of the magnetic $Fe_3O_4$ nanoparticles; after reaction for 0.5 h, the pH of the solution was adjusted to 3; the product was washed with water and methanol for 5 times, and the magnetic $Fe_3O_4@$ oleic acid nanoparticles were obtained after drying.

(2) Formulation of the oil phase solution: 2 g of the magnetic $Fe_3O_4@$ oleic acid nanoparticles were dissolved in 30 mL of DMF solution, and 3 g of N-vinylpyrrolidone, 2 g of divinylbenzene and 0.1 g of BPO were added respectively, and mixed uniformly under the ice bath to obtain the oil phase solution, wherein the mass of the N-vinylpyrrolidone accounted for 60% of the total mass of the N-vinylpyrrolidone and the divinylbenzene, and the mass of the initiator BPO accounted for 2% of the total mass of the N-vinylpyrrolidone and the divinylbenzene.

(3) Synthesis of the magnetic polymer adsorption material: 0.005 g of emulsifier SDS and 0.5 g of dispersant PVP were added into 100 mL of aqueous solution; half of the oil phase solution was added at 55° C. and the other half of the oil phase solution at 75° C., wherein the mass of the emulsifier accounted for 0.1% of the total mass of the N-vinylpyrrolidone and the divinylbenzene, and the mass of the dispersant accounted for 10% of the total mass of the N-vinylpyrrolidone and the divinylbenzene; after stirring for 24 h at 300 rpm, 75° C., the reacted solution was precipitated and filtered, the precipitate was washed with methanol for 5 times, and dried at 65° C. for 12 h to finally obtain the magnetic polymer adsorption material.

The magnetic polymer adsorption material obtained in this example had the particle size concentrated in 120 μm, the specific surface area of 254 $m^2/g$ and the magnetization of 9 emu/g. The adsorption capacity of the material to copper ions in water was 75 mg/g at 25° C. The magnetic polymer material saturated by copper ion adsorption was separated by an external magnetic field and then added into 0.1 mol/L hydrochloric acid solution, so that the copper ions could be released completely. Therefore, the material can also be used for the controlled release of copper ions.

Example 4

In this example, the preparation of the magnetic polymer adsorption material comprises the following steps:

(1) Preparation of the magnetic $Fe_3O_4@$ oleic acid nanoparticles: 3 g of ferrous chloride, 8 g of ferric chloride and 100 mL water were added into a 500 mL flask, electrically stirring and mixing, and nitrogen was introduced for protection, and then 20 mL of 4 mol/L sodium hydroxide solution and 7 g of oleic acid were added at 80° C., wherein the mass of the oleic acid was 1.2 times that of the magnetic $Fe_3O_4$ nanoparticles; after reaction for 6 h, the pH of the solution was adjusted to 3; the product was washed with water and ethanol for 5 times, and the magnetic $Fe_3O_4@$ oleic acid nanoparticles were obtained after drying.

(2) Formulation of the oil phase solution: 2 g of the magnetic $Fe_3O_4@$ oleic acid nanoparticles were dissolved in 60 mL of DMSO solution, and 2 g of N-vinylpyrrolidone, 4 g of divinylbenzene and 0.01 g of BPO were added respectively, and mixed uniformly under the ice bath to obtain the oil phase solution, wherein the mass of the N-vinylpyrrolidone accounted for 33% of the total mass of the N-vinylpyrrolidone and the divinylbenzene, and the mass of the initiator BPO accounted for 0.2% of the total mass of the N-vinylpyrrolidone and the divinylbenzene.

(3) Synthesis of the magnetic polymer adsorption material: 0.5 g of emulsifier SDS, 0.2 g of dispersant PEG and 0.075 g of dispersant HEC were added into 30 mL of aqueous solution; 90% of the oil phase solution was added at 40° C. and the rest of the oil phase solution at 64° C., wherein the mass of the emulsifier accounted for 8.3% of the total mass of the N-vinylpyrrolidone and the divinylbenzene, and the mass of the dispersants accounted for 4.6% of the total mass of the N-vinylpyrrolidone and the divinylbenzene; after stirring for 12 h at 800 rpm, 64° C., the reacted solution was precipitated and filtered, the precipitate was washed with methanol for 5 times, and dried at 65° C. for 12 h to finally obtain the magnetic polymer adsorption material.

The magnetic polymer adsorption material obtained in this example had the particle size concentrated in 70 μm, the specific surface area of 414 m²/g and the magnetization of 9 emu/g. The adsorption capacity of the material to triclosan (10 ppm) in water was 115 mg/g at 25° C. 100 mg of magnetic polymer material saturated by triclosan adsorption was separated by an external magnetic field and then added into 1 mL of methanol solvent, so that the adsorbed triclosan could be completely released after shaking. Therefore, the material can also be used for the controlled release of triclosan.

Example 5

In this example, the preparation of the magnetic polymer adsorption material comprises the following steps:

(1) Preparation of the magnetic $Fe_3O_4@$ oleic acid nanoparticles: 3 g of ferrous chloride, 1 g of ferric chloride and 200 mL water were added into a 500 mL flask, electrically stirring and mixing, and nitrogen was introduced for protection, and then 20 mL of 2 mol/L sodium hydroxide solution and 3 g of oleic acid were added at 80° C., wherein the mass of the oleic acid was 4.5 times that of the magnetic $Fe_3O_4$ nanoparticles; after reaction for 7 h, the pH of the solution was adjusted to 2; the product was washed with water and methanol for 5 times, and the magnetic $Fe_3O_4@$ oleic acid nanoparticles were obtained after drying.

(2) Formulation of the oil phase solution: 2 g of the magnetic $Fe_3O_4@$ oleic acid nanoparticles were dissolved in 10 mL of cyclohexanol solution, and 3.5 g of N-vinylpyrrolidone, 2.5 g of divinylbenzene and 0.006 g of AIBN were added respectively, and mixed uniformly under the ice bath to obtain the oil phase solution, wherein the mass of the N-vinylpyrrolidone accounted for 58% of the total mass of the N-vinylpyrrolidone and the divinylbenzene, and the mass of the initiator BPO accounted for 0.1% of the total mass of the N-vinylpyrrolidone and the divinylbenzene.

(3) Synthesis of the magnetic polymer adsorption material: 0.3 g of emulsifier SDS and 0.15 g of dispersant HEC were added into 50 mL of aqueous solution; 40% of the oil phase solution was added at 55° C. and the rest of the oil phase solution at 95° C., wherein the mass of the emulsifier accounted for 5% of the total mass of the N-vinylpyrrolidone and the divinylbenzene, and the mass of the dispersant accounted for 2.5% of the total mass of the N-vinylpyrrolidone and the divinylbenzene; after stirring for 80 h at 100 rpm, 95° C., the reacted solution was precipitated and filtered, the precipitate was washed with methanol for 5 times, and dried at 85° C. for 12 h to finally obtain the magnetic polymer adsorption material.

The magnetic polymer adsorption material obtained in this example had the particle size concentrated in 100 μm, the specific surface area of 225 m²/g and the magnetization of 9.5 emu/g. The adsorption capacity of the material to triclosan (10 ppm) in water was 98.5 mg/g at 25° C.

Example 6

In this example, the preparation of the magnetic polymer adsorption material comprises the following steps:

(1) Preparation of the magnetic $Fe_3O_4@$ oleic acid nanoparticles: 1 g of ferrous chloride, 2.5 g of ferric chloride and 150 mL water were added into a 250 mL flask, electrically stirring and mixing, and nitrogen was introduced for protection, and then 20 mL of saturated ammonia solution and 10 g of oleic acid were added at 80° C., wherein the mass of the oleic acid was 5 times that of the magnetic $Fe_3O_4$ nanoparticles; after reaction for 5 h, the pH of the solution was adjusted to 1; the product was washed with water and methanol for 5 times, and the magnetic $Fe_3O_4@$ oleic acid nanoparticles were obtained after drying.

(2) Formulation of the oil phase solution: 2 g of the magnetic $Fe_3O_4@$ oleic acid nanoparticles were dissolved in 30 mL of DMF solution, and 0.5 g of N-vinylpyrrolidone, 4.5 g of divinylbenzene and 0.1 g of BPO were added respectively, and mixed uniformly under the ice bath to obtain the oil phase solution, wherein the mass of the N-vinylpyrrolidone accounted for 10% of the total mass of the N-vinylpyrrolidone and the divinylbenzene, and the mass of the initiator BPO accounted for 2% of the total mass of the N-vinylpyrrolidone and the divinylbenzene.

(3) Synthesis of the magnetic polymer adsorption material: 0.3 g of emulsifier SDS was added into 200 mL of aqueous solution; 45% of the oil phase solution was added at 55° C. and the rest of the oil phase solution at 60° C., wherein the mass of the emulsifier accounted for 6% of the total mass of the N-vinylpyrrolidone and the divinylbenzene; after stirring for 48 h at 700 rpm, 60° C., the reacted solution was precipitated and filtered, the precipitate was washed with methanol for 5 times, and dried at 75° C. for 12 h to finally obtain the magnetic polymer adsorption material.

The magnetic polymer adsorption material obtained in this example had the particle size concentrated in 40 μm, the specific surface area of 624 m²/g and the magnetization of 11.2 emu/g. The adsorption capacity of the material to zinc ions in water was 75.2 mg/g at 25° C.

Example 7

In this example, the preparation of the magnetic polymer adsorption material comprises the following steps:

(1) Preparation of the magnetic $Fe_3O_4@$ oleic acid nanoparticles: 5 g of ferrous chloride, 7 g of ferric chloride and 300 mL water were added into a 500 mL flask, electrically stirring and mixing, and nitrogen was introduced for protection, and then 50 mL of 2 mol/L sodium hydroxide solution and 2 g of oleic acid were added at 70° C., wherein the mass of the oleic acid was 0.5 time that of the magnetic $Fe_3O_4$ nanoparticles; after reaction for 6 h, the pH of the solution was adjusted to 2; the product was washed with water and methanol for 5 times, and the magnetic $Fe_3O_4@$ oleic acid nanoparticles were obtained after drying.

(2) Formulation of the oil phase solution: 1 g of the magnetic $Fe_3O_4@$ oleic acid nanoparticles were dissolved in 20 mL of toluene solution, and 4.5 g of N-vinylpyrrolidone, 0.5 g of divinylbenzene and 0.1 g of AIBN were added respectively, and mixed uniformly under the ice bath to obtain the oil phase solution, wherein the mass of the N-vinylpyrrolidone accounted for 90% of the total mass of the N-vinylpyrrolidone and the divinylbenzene, and the mass of the initiator AIBN accounted for 2% of the total mass of the N-vinylpyrrolidone and the divinylbenzene.

(3) Synthesis of the magnetic polymer adsorption material: 1 g of emulsifier HTAB was added into 200 mL of aqueous solution; one third of the oil phase solution was added at 35° C. and the rest of the oil phase solution at 75° C., wherein the mass of the emulsifier accounted for 20% of the total mass of the N-vinylpyrrolidone and the divinylbenzene; after stirring for 36 h at 1500 rpm, 75° C., the reacted solution was precipitated and filtered, the precipitate was washed with methanol for 5 times, and dried at 75° C. for 24 h to finally obtain the magnetic polymer adsorption material.

The magnetic polymer adsorption material obtained in this example had the particle size concentrated in 50 μm, the specific surface area of 772 m$^2$/g and the magnetization of 19.5 emu/g.

Example 8

In this example, the preparation of the magnetic polymer adsorption material comprises the following steps:

(1) Preparation of the magnetic $Fe_3O_4$@ oleic acid nanoparticles: 5 g of ferrous chloride, 8 g of ferric chloride and 200 mL water were added into a 500 mL flask, electrically stirring and mixing, and nitrogen was introduced for protection, and then 20 mL of 4 mol/L sodium hydroxide solution and 9 g of oleic acid were added at 80° C., wherein the mass of the oleic acid was 1.45 times that of the magnetic $Fe_3O_4$ nanoparticles; after reaction for 12 h, the pH of the solution was adjusted to 1; the product was washed with water and ethanol for 5 times, and the magnetic $Fe_3O_4$@ oleic acid nanoparticles were obtained after drying.

(2) Formulation of the oil phase solution: 2 g of the magnetic $Fe_3O_4$@ oleic acid nanoparticles were dissolved in 30 mL of DMSO solution, and 2 g of N-vinylpyrrolidone, 8 g of divinylbenzene and 0.5 g of BPO were added respectively, and mixed uniformly under the ice bath to obtain the oil phase solution, wherein the mass of the N-vinylpyrrolidone accounted for 20% of the total mass of the N-vinylpyrrolidone and the divinylbenzene, and the mass of the initiator BPO accounted for 5% of the total mass of the N-vinylpyrrolidone and the divinylbenzene.

(3) Synthesis of the magnetic polymer adsorption material: 0.3 g of emulsifier SDS, 0.22 g of dispersant PEG and 0.075 g of dispersant HEC were added into 150 mL of aqueous solution; 45% of the oil phase solution was added at 45° C. and the rest of the oil phase solution at 65° C., wherein the mass of the emulsifier accounted for 3% of the total mass of the N-vinylpyrrolidone and the divinylbenzene, and the mass of the dispersants accounted for 3% of the total mass of the N-vinylpyrrolidone and the divinylbenzene; after stirring for 36 h at 600 rpm, 65° C., the reacted solution was precipitated and filtered, the precipitate was washed with methanol for 5 times, and dried at 65° C. for 12 h to finally obtain the magnetic polymer adsorption material.

The magnetic polymer adsorption material obtained in this example had the particle size concentrated in 2 μm, the specific surface area of 950 m$^2$/g and the magnetization of 15 emu/g. The adsorption capacity of the material to phenol (100 ppm) in water was 380.5 mg/g at 25° C.

Example 9

In this example, the preparation of the magnetic polymer adsorption material comprises the following steps:

(1) Preparation of the magnetic $Fe_3O_4$@ citric acid nanoparticles: 2.5 g of ferrous chloride, 4 g of ferric chloride and 200 mL water were added into a 500 mL flask, electrically stirring and mixing, and nitrogen was introduced for protection, and then 20 mL of 4 mol/L sodium hydroxide solution and 5 g of sodium citrate were added at 80° C., wherein the mass of the citric acid was 1.5 times that of the magnetic $Fe_3O_4$ nanoparticles; after reaction for 10 h, the pH of the solution was adjusted to 2; the product was washed with water and ethanol for 5 times, and the magnetic $Fe_3O_4$@ citric acid nanoparticles were obtained after drying.

(2) Formulation of the oil phase solution: 2.2 g of the magnetic $Fe_3O_4$@ citric acid nanoparticles were dissolved in 30 mL of DMSO solution, and 2 g of N-vinylpyrrolidone, 8 g of divinylbenzene and 0.3 g of BPO were added respectively, and mixed uniformly under the ice bath to obtain the oil phase solution, wherein the mass of the N-vinylpyrrolidone accounted for 20% of the total mass of the N-vinylpyrrolidone and the divinylbenzene, and the mass of the initiator BPO accounted for 3% of the total mass of the N-vinylpyrrolidone and the divinylbenzene.

(3) Synthesis of the magnetic polymer adsorption material: 0.3 g of emulsifier SDS, 0.22 g of dispersant PEG and 0.075 g of dispersant HEC were added into 150 mL of aqueous solution; 45% of the oil phase solution was added at 45° C. and the rest of the oil phase solution at 65° C., wherein the mass of the emulsifier accounted for 3% of the total mass of the N-vinylpyrrolidone and the divinylbenzene, and the mass of the dispersants accounted for 3% of the total mass of the N-vinylpyrrolidone and the divinylbenzene; after stirring for 36 h at 600 rpm, 65° C., the reacted solution was precipitated and filtered, the precipitate was washed with methanol for 5 times, and dried at 65° C. for 12 h to finally obtain the magnetic polymer adsorption material.

The magnetic polymer adsorption material obtained in this example had the particle size concentrated in 20 μm, the specific surface area of 345 m$^2$/g and the magnetization of 10 emu/g. The adsorption capacity of the material to phenol (100 ppm) in water was 220.5 mg/g at 25° C.

Table 1 shows the parameters and properties of the materials prepared in Examples 1-9.

TABLE 1

Parameters and properties of the materials prepared in Examples 1-9

| Example | Particle size | Specific surface area | Magnetization | Adsorbed pollutants | Adsorption capacity |
|---|---|---|---|---|---|
| Material of Example 1 | 100 μm | 681.5 m$^2$/g | 15 emu/g | Nitrobenzene compounds | 389 mg/g |
| Material of Example 2 | 10 μm | 714 m$^2$/g | 12 emu/g | Tetracycline | 275 mg/g |
| Material of Example 3 | 120 μm | 254 m$^2$/g | 9 emu/g | Copper ions | 75 mg/g |
| Material of Example 4 | 70 μm | 414 m$^2$/g | 9 emu/g | Triclosan | 115 mg/g |
| Material of Example 5 | 100 μm | 225 m$^2$/g | 9.5 emu/g | Triclosan | 98.5 mg/g |

TABLE 1-continued

Parameters and properties of the materials prepared in Examples 1-9

| Example | Particle size | Specific surface area | Magnetization | Adsorbed pollutants | Adsorption capacity |
|---|---|---|---|---|---|
| Material of Example 6 | 40 μm | 624 m$^2$/g | 11.2 emu/g | Zinc ions | 75.2 mg/g |
| Material of Example 7 | 50 μm | 772 m$^2$/g | 19.5 emu/g | — | — |
| Material of Example 8 | 2 μm | 950 m$^2$/g | 15 emu/g | Phenol | 380.5 mg/g |
| Material of Example 9 | 20 μm | 345 m$^2$/g | 10 emu/g | Phenol | 220.5 mg/g |
| Comparative Example A | — | — | <0.1 emu/g | — | — |
| Comparative Example B | — | — | <0.3 emu/g | — | — |

Since the material has adsorption and controlled release properties to multiple substances, it can be used for separation of different substances.

The present invention and embodiments thereof have been schematically described above, and the description is not restrictive. The accompanying drawings show only one of the embodiments of the present invention, and the actual process is not limited thereto. Therefore, if a person of ordinary skill in the art designs similar structural modes and embodiments without creativity under the enlightenment without departing from the creation purpose of the present invention, the structural modes and the embodiments should fall within the protection scope of the present invention.

What is claimed is:

1. A method for preparing a magnetic polymer adsorption material, comprising the following steps:
   (1) preparing magnetic nanoparticles;
   (2) formulating a first solution comprising the steps of: dissolving the magnetic nanoparticles prepared in step (1) in an agent, adding N-vinylpyrrolidone, divinylbenzene and an initiator respectively, and mixing uniformly under the condition of ice bath; and
   (3) synthesizing the magnetic polymer adsorption material comprising the steps of: adding an emulsifier and/or a dispersant into an aqueous solution; adding a part of the first solution prepared in step (2) at the temperature below 60° C. into said aqueous solution, and adding the rest of the first solution when the temperature rises to 60° C. or above, wherein the volume of the first solution added each time accounts for 10-90% of the total volume of the total first solution, reacting with stirring, then precipitating and filtering the reacted solution, washing and drying the precipitate, and finally obtaining the magnetic polymer adsorption material.

2. The method for preparing a magnetic polymer adsorption material according to claim 1, wherein the magnetic nanoparticles are $Fe_3O_4$ organic acid nanoparticles, and the preparation process comprises: formulating soluble salts of $Fe^{2+}$ and $Fe^{3+}$ into a solution, mixing, introducing nitrogen for protection, adding a precipitating agent and an organic acid at 60-100° C., reacting for 0.5-12 h, adjusting the pH of the solution to be acidic, and washing and drying the product to obtain the magnetic $Fe_3O_4$ organic acid nanoparticles.

3. The method for preparing a magnetic polymer adsorption material according to claim 1, wherein in step (3), the stirring is performed at 100-1500 rpm for 12-80 h, and the reaction with stirring is performed at 60-95° C.

4. The method for preparing a magnetic polymer adsorption material according to claim 1, wherein the mass of the N-vinylpyrrolidone accounts for 10-90% of the total mass of the N-vinylpyrrolidone and the divinylbenzene.

5. The method for preparing a magnetic polymer adsorption material according to claim 1, wherein the volume of the agent is 0.05-2 times that of the aqueous solution; the mass of the emulsifier or dispersant accounts for 0.1-10% of the total mass of the N-vinylpyrrolidone and the divinylbenzene; and the mass of the initiator accounts for 0.1-5% of the total mass of the N-vinylpyrrolidone and the divinylbenzene.

6. The method for preparing a magnetic polymer adsorption material according to claim 2, wherein the initiator is an azo or benzoyl compound; the agent is one or more of methanol, toluene, cyclohexanol, Dimethylformamide and Dimethyl sulfoxide; the emulsifier is an anionic surfactant; the dispersant is one or more of Polyvinylpyrrolidone, Hydroxyethylcellulose and Polyethylene glycol; the molar ratio of the soluble salt of $Fe^{2+}$ to the soluble salt of $Fe^{3+}$ is 1:(0.23-5.5); the mass of the organic acid is 0.5-5 times that of the magnetic $Fe_3O_4$ nanoparticles; and the precipitating agent is an alkaline solution.

* * * * *